No. 877,630. PATENTED JAN. 28, 1908.
P. F. BUSSMAN.
ROLLER BEARING.
APPLICATION FILED NOV. 28, 1906.

Witnesses:
Louis W. Gratz
Richard Sommer

Paul F. Bussman, Inventor
by Geyer & Popp,
Attorneys

UNITED STATES PATENT OFFICE.

PAUL F. BUSSMAN, OF BUFFALO, NEW YORK.

ROLLER-BEARING.

No. 877,630.      Specification of Letters Patent.      Patented Jan. 28, 1908.

Application filed November 28, 1906. Serial No. 345,429.

*To all whom it may concern:*

Be it known that I, PAUL F. BUSSMAN, a citizen of the United States, residing at Buffalo, in the county of Erie and State of New York, have invented a new and useful Improvement in Roller-Bearings, of which the following is a specification.

This invention relates more particularly to taper roller bearings.

In bearings of this type, the lubricant has a tendency to move outward under the influence of centrifugal force, causing the inner portions of the rollers to run dry.

The object of my invention is to so construct the rollers as to counteract this tendency and insure a uniform distribution of the lubricant over the treads or surfaces of the roller race.

Figure 1:
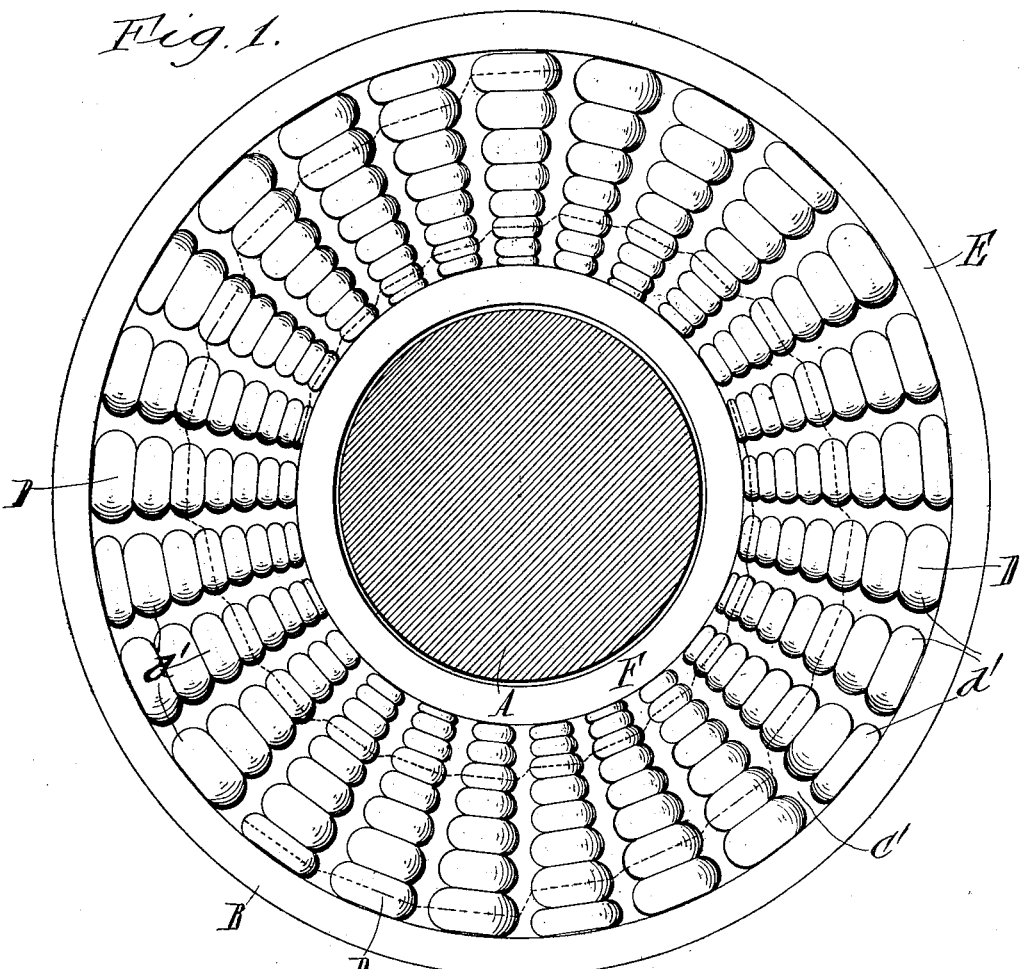
Figure 2:
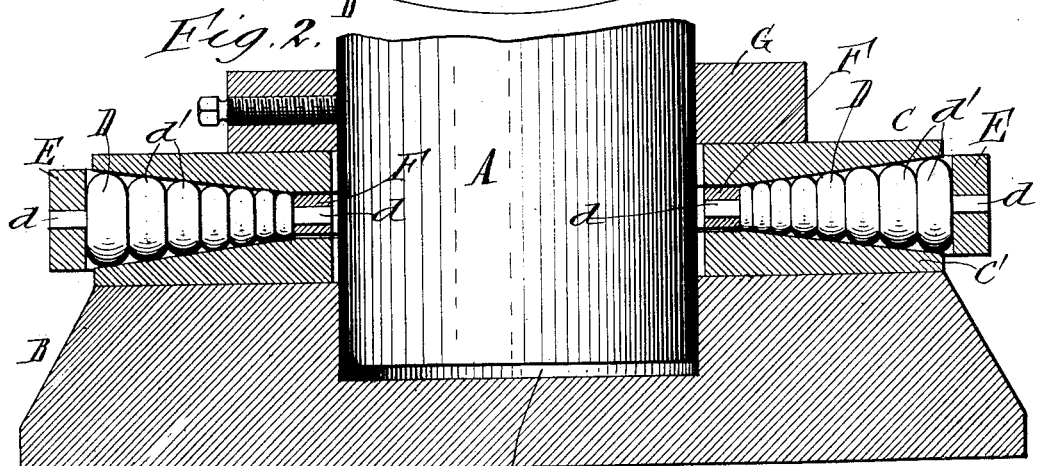

In the accompanying drawing: Figure 1 is a horizontal section of a bearing embodying the invention, the plane of the section being immediately above the rollers and the base being omitted. Fig. 2 is a vertical central section of the bearing.

Similar letters of reference indicate corresponding parts in both figures.

A indicates a vertical shaft supported by the bearing and having its lower end arranged in a socket $b$ formed in a suitable base B.

C, C¹ are the bearing cones or treads forming the race in which the tapering rollers D run freely. The rollers may be provided with the usual end pins $d$ journaled in concentric retaining rings E, F. The lower bearing cone C¹ rests upon the base B, and the shaft carries an adjusting collar G which rests upon the upper bearing member C.

The rollers are arranged radially and equidistant in the race in the customary manner with sufficient intervening space to keep them out of contact with one another. Each roller is corrugated transversely, or in other words, provided with a series of annular ribs or projections $d^1$, preferably of rounded or convex form upon the salient faces of which the roller runs, thus reducing friction accordingly. The ribs of each roller are offset or out of line with those of the rollers immediately in front and in rear thereof and the corresponding ribs of adjacent rollers are progressively arranged closer to the axis of the bearing. By this arrangement, the rollers form collectively one or more spiral series of annular projections which in rolling over the walls or treads of the race tend to crowd or deflect the customary soft lubricant toward the axis or the periphery of the bearing according to the direction in which the shaft rotates. As the lubricant tends to work toward the periphery of the bearing, the offset ribs of adjacent rollers are arranged to trend in the proper direction to counteract such tendency and thus maintain a practically even distribution of the lubricant over the bearing cones or surfaces. The dotted lines in Fig. 1 indicate the spiral trend of the ribs.

The grooves between the ribs of the rollers form cavities which become filled with the lubricant and further check its tendency to move toward the outer edge of the bearing. These grooves also form pockets for receiving any grit in the lubricant, thus preventing the grit from entering between the salient faces of the ribs and the walls of the race and grinding the bearing.

The same bearing may be used either right or left, according to the direction of rotation of the shaft, by simply reversing it from one position to the other.

I claim as my invention:

1. In a roller bearing, the combination of a race, and rollers arranged therein and provided with lubricant-deflecting portions arranged side by side, the deflecting portions of adjacent rollers being offset on spiral lines, substantially as set forth.

2. In a roller bearing, the combination of a race, and taper rollers arranged therein and provided with annular ribs or projections, the ribs of adjacent rollers being offset on spiral lines, substantially as set forth.

3. In a roller bearing, the combination of a race, and taper rollers arranged therein and provided with convex annular ribs arranged side by side, the ribs of adjacent rollers being offset progressively from the periphery toward the center of the bearing, substantially as set forth.

Witness my hand this 19th day of November, 1906.

PAUL F. BUSSMAN.

Witnesses:
CARL F. GEYER,
E. M. GRAHAM.